(12) United States Patent
Sulc et al.

(10) Patent No.: US 8,109,327 B2
(45) Date of Patent: Feb. 7, 2012

(54) TEMPERATURE CONTROL SYSTEM HAVING HEAT EXCHANGE MODULES WITH INDIRECT EXPANSION COOLING AND IN-TUBE ELECTRIC HEATING

(75) Inventors: Vladimir Sulc, Minnetonka, MN (US); Panayu Robert Srichai, Minneapolis, MN (US); Michal Hegar, Za Zameckem (CZ)

(73) Assignee: Thermo King Corporation, Minneapolis, MN (US)

( * ) Notice: Subject to any disclaimer, the term of this patent is extended or adjusted under 35 U.S.C. 154(b) by 1078 days.

(21) Appl. No.: 11/877,094

(22) Filed: Oct. 23, 2007

(65) Prior Publication Data

US 2008/0092564 A1    Apr. 24, 2008

Related U.S. Application Data

(60) Provisional application No. 60/862,542, filed on Oct. 23, 2006.

(51) Int. Cl.
*B60H 1/00* (2006.01)
(52) U.S. Cl. .......................... 165/203; 165/207; 165/219
(58) Field of Classification Search .................. 165/203, 165/207, 219, 218, 205, 210, 253, 296, 43, 165/42; 62/90, 81
See application file for complete search history.

(56) References Cited

U.S. PATENT DOCUMENTS

| | | | |
|---|---|---|---|
| 1,980,688 A | 11/1934 | Lewis | |
| 2,660,407 A | 11/1953 | Lehane | |
| 2,778,206 A | 1/1957 | Wilson et al. | |
| 3,682,240 A | 8/1972 | Cira | |
| 3,734,169 A | 5/1973 | Falk | |
| 4,344,299 A | 8/1982 | Latzer | |
| 4,402,191 A | 9/1983 | King | |
| 4,422,304 A | 12/1983 | Kuttel | |
| 4,553,584 A | 11/1985 | Bloomquist | |
| 4,685,306 A | 8/1987 | Howland et al. | |
| 4,706,468 A | 11/1987 | Howland et al. | |

(Continued)

FOREIGN PATENT DOCUMENTS

JP     11142042 A     5/1999

OTHER PUBLICATIONS

US 5,706,890, 01/1998, Sloan et al. (withdrawn)

*Primary Examiner* — Judy Swann
*Assistant Examiner* — Devon Russell
(74) *Attorney, Agent, or Firm* — Michael Best & Friedrich LLP

(57) ABSTRACT

A temperature control system for a container includes a refrigeration circuit having a primary fluid circulating therein and a secondary fluid circuit in communication with a first compartment of the container and a second compartment of the container. The secondary fluid circuit has a secondary fluid separate from the primary fluid circulating therein. The secondary fluid circuit includes a first heat exchange module in communication with an interior load space of the first compartment and a second heat exchange module in communication with an interior load space of the second compartment. Each of the first and second heat exchange modules includes a pump, a heater, a heat exchanger, and a three-way valve. A heat exchange interface between the refrigeration circuit and the secondary fluid circuit is operable to transfer heat from the secondary fluid to the primary fluid.

20 Claims, 2 Drawing Sheets

U.S. PATENT DOCUMENTS

| | | |
|---|---|---|
| 4,711,095 A | 12/1987 | Howland et al. |
| 4,712,383 A | 12/1987 | Howland et al. |
| 5,142,877 A | 9/1992 | Shimizu |
| 5,531,264 A | 7/1996 | Eike et al. |
| 5,582,236 A * | 12/1996 | Eike et al. ............ 165/43 |
| 5,743,102 A * | 4/1998 | Thomas et al. ............ 62/185 |
| 5,884,697 A | 3/1999 | Pierron et al. |
| 6,196,295 B1 | 3/2001 | Durham |
| 6,230,508 B1 | 5/2001 | Baker et al. |
| 6,749,016 B2 * | 6/2004 | Ozawa ............ 165/264 |
| 7,178,346 B2 * | 2/2007 | Huang et al. ............ 62/81 |
| 2002/0129613 A1 | 9/2002 | Viegas et al. |

* cited by examiner

TEMPERATURE CONTROL SYSTEM HAVING HEAT EXCHANGE MODULES WITH INDIRECT EXPANSION COOLING AND IN-TUBE ELECTRIC HEATING

CROSS-REFERENCE TO RELATED APPLICATIONS

This application is a non-provisional of U.S. Provisional Patent Application No. 60/862,542, filed on Oct. 23, 2006, the entire contents of which are hereby incorporated by reference.

SUMMARY

In one embodiment, the present invention provides a temperature control system for a container with multiple compartments. The temperature control system includes a refrigeration circuit having a primary fluid circulating therein and a secondary fluid circuit in communication with a first compartment of the container and a second compartment of the container. The secondary fluid circuit has a secondary fluid separate from the primary fluid circulating therein. The secondary fluid circuit includes a first heat exchange module in communication with an interior load space of the first compartment and a second heat exchange module in communication with an interior load space of the second compartment. Each of the first and second heat exchange modules includes a pump configured to pump the secondary fluid, a heater selectively operable to heat the secondary fluid, a heat exchanger positioned within the respective interior load space, and a three-way valve configured to control the flow of the secondary fluid through the respective heat exchange module. A heat exchange interface between the refrigeration circuit and the secondary fluid circuit is operable to transfer heat from the secondary fluid to the primary fluid.

In another embodiment, the invention provides a temperature control system for controlling the temperature within a container. The temperature control system includes a refrigeration circuit having a primary fluid circulating therein. A secondary fluid circuit has a secondary fluid circulating therein, the secondary fluid being in heat exchange communication with the primary fluid and also with an interior load space of the container. The secondary fluid circuit includes a heat exchanger positioned within the interior load space, a pump configured to pump the secondary fluid through the heat exchanger, a heater selectively operable to heat the secondary fluid, and a three-way valve configured to control the flow of the secondary fluid within the secondary fluid circuit. A heat exchange interface between the refrigeration circuit and the secondary fluid circuit is operable to transfer heat from the secondary fluid to the primary fluid. The three-way valve is movable between a first position, in which the secondary fluid is directed from the heat exchanger to the heat exchange interface and a second position, in which the secondary fluid is substantially recycled through the heat exchanger without being directed to the heat exchange interface.

In yet another embodiment, the invention provides a temperature control system for controlling the temperature within a container. The temperature control system includes a heat exchanger positioned within an interior load space of the container, a heater in series with the heat exchanger along a fluid circuit loop, a pump in series with the heater and the heat exchanger along the fluid circuit loop, and a valve positioned along the fluid circuit loop, the valve having an inlet, a first outlet, and a second outlet. The first outlet is coupled to a fluid return line, and the second outlet is coupled to an inlet of the pump. A heat exchange fluid is configured to circulate through the fluid circuit loop. A refrigeration circuit separate from the fluid circuit loop is operable to draw heat from the heat exchange fluid at a heat exchange interface, the fluid circuit loop being in heat exchange communication with the refrigeration circuit at the heat exchange interface by the fluid return line and by a fluid supply line of the fluid circuit loop. The fluid supply line is operable to supply heat exchange fluid cooled by the refrigeration circuit to the inlet of the pump.

In yet another embodiment, the invention provides a method of controlling the temperature within an interior load space of a container. The method includes the steps described below. A heat exchange fluid is pumped through a heater and a heat exchanger of a fluid circuit loop with the heater set to an off condition so as not to heat the heat exchange fluid. Heat is transferred from the interior load space into the heat exchange fluid. Heated heat exchange fluid is directed through a valve in the fluid circuit loop to a heat exchange interface, whereby heat from the heat exchange fluid is transferred to a refrigerant circuit separate from the fluid circuit loop such that the heat exchange fluid is cooled. Cooled heat exchange fluid is circulated back into the fluid circuit loop. The position of the valve in the fluid circuit loop is changed to at least partially limit the flow of heated heat exchange fluid to the heat exchange interface and at least partially close the fluid circuit loop. Heat exchange fluid is circulated through the fluid circuit loop with the heater set to an on condition.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
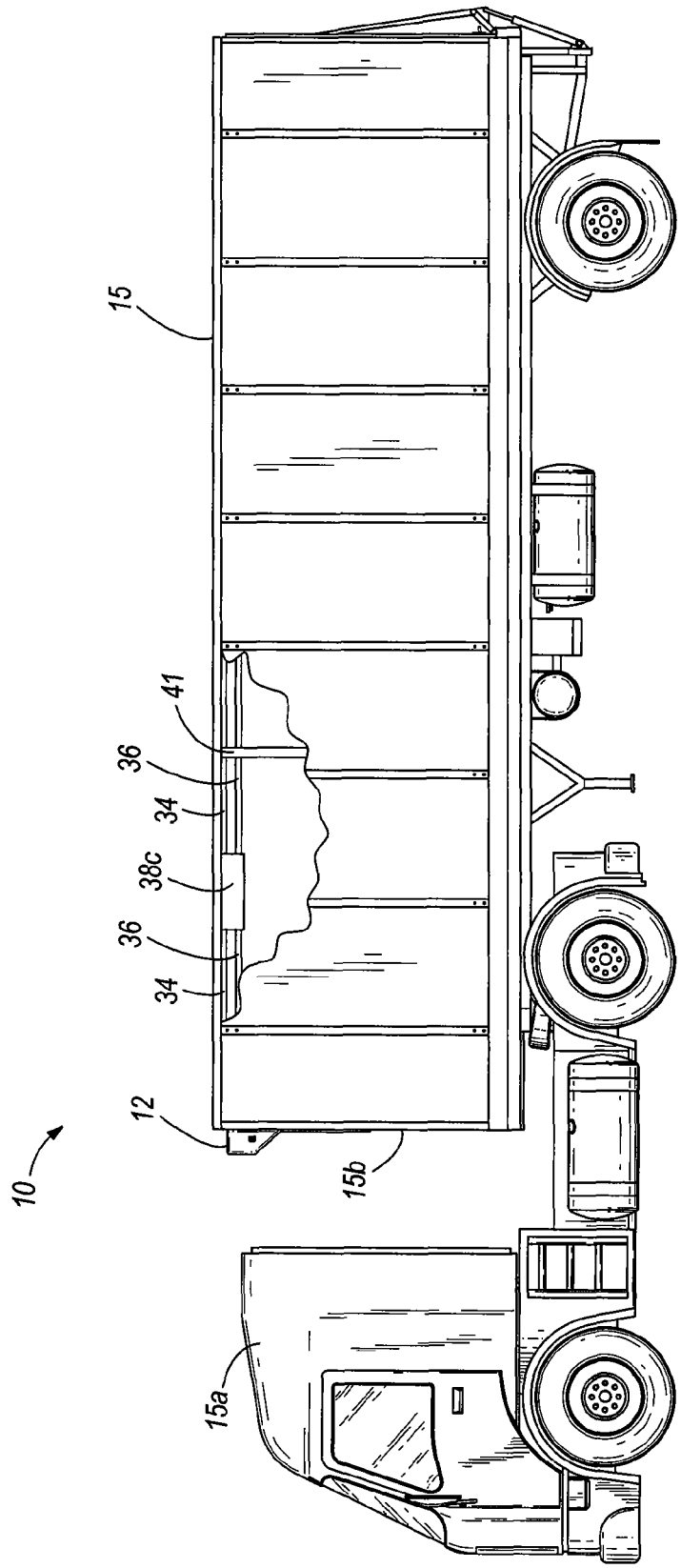
FIG. 1 is a side view of a transport container incorporating a temperature control system of the present invention.
Figure 2:
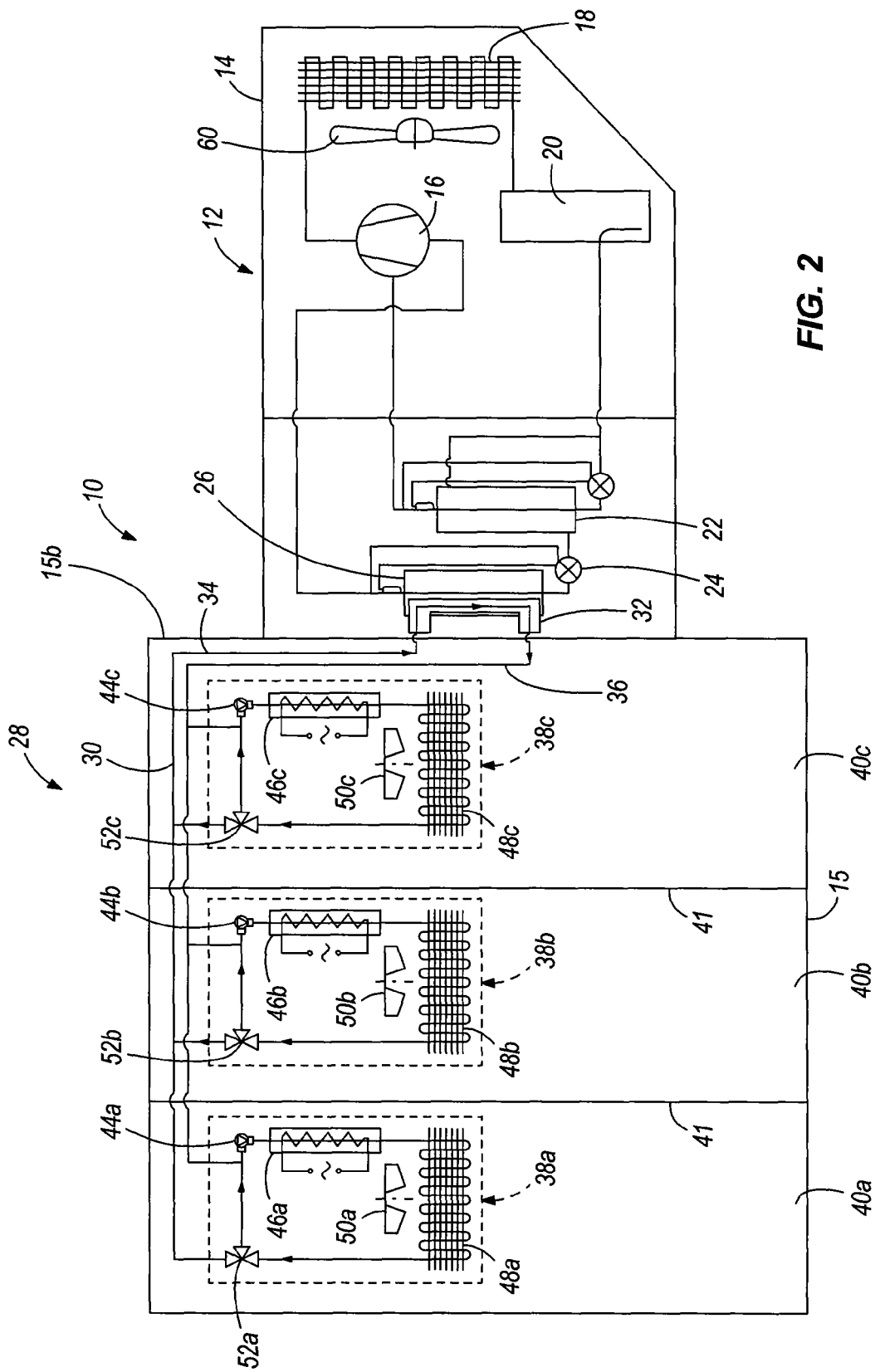
FIG. 2 is a schematic view of the temperature control system according to one embodiment of the present invention.

The temperature control system 10 of FIGS. 1 and 2 includes a refrigeration unit 12 having a refrigeration circuit 14. As shown in FIG. 1, the temperature control system 10 is used with a container 15 defining a load space therein. The illustrated container 15 is a trailer configured to be coupled to a semi truck 15a for road transport. In other embodiments, the container 15 takes different forms including, but not limited to, an integrated truck box and a cargo container configured for transport on railroads and/or ships, etc. As shown in FIG. 1, the refrigeration unit 12 is positioned on the outside surface of a front wall 15b of the container 15. In other embodiments, the refrigeration unit 12 is partially or entirely positioned inside the container 15 (either within the load space or inside a separate compartment). Furthermore, the refrigeration unit 12 can be partially or entirely positioned at other locations relative to the container 15 including, but not limited to, on top of the container 15 and below the container 15.

As shown in FIG. 2, the refrigeration circuit 14 includes a compressor 16, a condenser 18, a receiver 20, an economizer 22, an expansion valve 24, and an evaporator 26 fluidly connected in series. The refrigeration circuit 14 is a reverse-Rankine thermodynamic cycle refrigeration system, which circulates a first heat exchange fluid (i.e., "refrigerant"). Refrigerant vapor is compressed by the compressor 16 to an elevated pressure and discharged into the condenser 18. While passing through the condenser 18, heat is rejected from the refrigerant, and the high-pressure refrigerant changes phase from a vapor to a liquid. The high-pressure liquid refrigerant is pre-cooled by the economizer 22 and then throttled through the expansion device 24 to a lower pressure, resulting in a phase change to a two-phase refrigerant (i.e., a liquid-vapor mixture). The low-pressure, two-phase refrigerant flows through the evaporator 26 where it absorbs heat and boils to a vapor. From the evaporator 26, the low pressure vapor is drawn into the compressor 16 to repeat the reverse-Rankine thermodynamic cycle. In other embodiments, other common refrigeration cycles are used.

The temperature control system 10 further includes an air cooling unit 28, which contains a secondary heat exchange (e.g., "coolant") fluid that passes through a secondary circuit 30. As described in further detail below, the secondary circuit 30 forms a loop, separate from the refrigeration circuit 14. The secondary heat exchange fluid is separate from and does not mix with the refrigerant within the refrigeration circuit 14. The secondary circuit 30 includes a cooler 32 in heat exchange relationship with the evaporator 26 of the refrigeration circuit 14. A return line 34 is fluidly connected to an upstream end of the cooler 32, and a supply line 36 is fluidly connected to a downstream end of the cooler 32. The cooler 32 of the secondary circuit 30 and the evaporator 26 of the refrigeration circuit 14 constitute a heat exchange interface between the secondary circuit 30 and the refrigeration circuit 14.

The air cooling unit 28 includes three separate heat exchange modules 38a, 38b, 38c (collectively referenced as 38) located in three separate compartments 40a, 40b, 40c (collectively referenced as 40) of the container 15. Insulated walls 41 isolate the compartments 40 both physically and thermally. Each module 38 is fluidly connected between the supply line 36 and the return line 34 (i.e., the modules 38 are connected in parallel). The specific numbers of compartments 40, modules 38, and modules 38 per compartment 40 can vary depending on the configuration of the container 15, the capacity for each compartment 40, and the total available capacity of the refrigeration unit 12.

Although the temperature control system 10 is illustrated and described as being used in a transport application, the temperature control system 10 can also be used in other applications such as stationary systems. For example, the temperature control system 10 can be used in refrigerated display cases, heat sinks, or electronic cooling systems. In other applications, the heat exchange modules 38 need not be associated with compartments of a container, but can be used to cool, by air or another cooling fluid, separate or partially separate portions of an item or area to be cooled.

Each heat exchange module 38 consists of a fluid pump 44 (single-speed or multi-speed), a powered in-tube electric heater 46, a heat exchanger, or "air cooler/heater" 48 (having a multi-speed blower 50), and a three-way valve 52, all of which are fluidly connected in series. The three-way valve 52 is connected between the air cooler/heater 48, the return line 30, and the fluid pump 44. The three-way valve 52 includes a single inlet fluidly connected to the air cooler/heater 48. The three-way valve 52 further includes a first outlet fluidly connected to the return line 30 and a second outlet fluidly connected to the fluid pump 44. The three-way valve 52 can operate as a two-position valve where only one outlet is in communication with the inlet at a given time, or alternately, can operate as a three-way stepper valve (as schematically illustrated by valve 52c) used to provide more precise temperature control by circulating a first portion of the secondary coolant fluid from the air cooler/heater 48c to the cooler 32 and back to the air cooler/heater 48c through the fluid pump 44c and the in-tube electric heater 46c and further circulating a second portion of the secondary coolant fluid from the air cooler/heater 48c directly back to the air cooler/heater 48c through the fluid pump 44 and the in-tube electric heater 46c without flowing to the cooler 32.

In some embodiments, the heat exchanger 48 cools and/or heats one or more substances other than air. For example, the heat exchanger 48 can be used to cool and/or heat a heat exchange liquid. In such a case, a liquid pump can be used rather than the blower 50 to encourage heat transfer between the heat exchanger 48 and the heat exchange liquid.

The temperature control system 10 can be used in single and multi-temperature applications, and can operate in one or more of a refrigeration (or cooling) mode, a defrost mode, and a heating mode.

In the cooling mode, as represented by the heat exchange module 38b in the second compartment 40b, the supply line 36 provides chilled secondary coolant fluid from the cooler 32 to the heat exchange module 38b. More specifically, the fluid pump 44b runs the secondary coolant fluid into the air cooler/heater 48b through the in-tube electric heater 46b, which is in the off (non-energized) position. The secondary coolant fluid draws heat from the air within the load space of the compartment 40b such that the secondary coolant fluid becomes heated. The three-way valve 52b is configured in a first position to allow the secondary coolant fluid to flow through the heat exchange module 38b and return via the return line 34 to the cooler 32. In the cooling mode, the secondary circuit 30 is configured as a loop to circulate the secondary coolant fluid between the cooler 32 and the air cooler/heater 48b so that heat is transferred from the air within the load space of the compartment 40b to the refrigeration circuit 14.

In the heating and defrost modes, as represented by the heat exchange module 38a, the three-way valve 52a is configured in a second position to block the flow of secondary heat exchange fluid between the air cooler/heater 48a and the cooler 32. In the second position, the three-way valve 52a is configured to prevent the secondary heat exchange fluid from transferring heat to the refrigeration circuit 14 at the cooler 32. The fluid pump 44a circulates secondary heat exchange fluid only within the heat exchange module 38a, as secondary heat exchange fluid cannot flow from the air cooler/heater 48a into the return line 34. The pump 44a pumps the secondary heat exchange fluid through the closed loop of the heat exchange module 38a without being cooled or chilled by the refrigeration unit 12. As needed or desired, the in-tube electric heater 46a is turned on to heat the secondary heat exchange fluid. If all of the compartments 40 are being heated, the refrigeration unit 12 can be turned off.

Two of many possible methods of providing temperature control within the compartments 40 are described below.

First, when the temperature (e.g., air temperature) within the load space of a compartment 40 reaches a set point during a temperature pull down operation (e.g., cooling mode), the fluid pump 44 of the associated heat exchange module 38 is stopped. The three-way valve 52 is switched from the cooling position (illustrated by the valve 52b) to the heating/defrost position (illustrated by the valve 52a) to prevent the flow of secondary heat exchange fluid into the return line 34 and subsequently the cooler 32. If a set point temperature is reached during a temperature pull up operation (e.g., heating/defrost mode), the fluid pump 44 is switched off, but the position of the three-way valve 52 is not switched from the heating/defrost position (illustrated by the valve 52a) to the cooling position (illustrated by the valve 52b), but rather remains in the second position so that secondary heat exchange fluid is circulated only within the heat exchange module 38.

A second method of providing temperature control within the compartments 40 is described below. When the temperature (e.g., air temperature) within the load space of a compartment 40 reaches a set point, the desired temperature within the compartment 40 can be maintained by selectively controlling one or more of: the speed of the fluid pump 44, the speed of the blower 50 of the air cooler/heater 48, the amount of power to the in-tube electric heater 46, and the position of the three-way valve 52, as represented by the three-way valve 52c of heat exchange module 38c. This method is equally effective regardless of whether the associated heat exchange module 38 is in the cooling mode or the heating/defrost mode.

Thus, the temperature in each compartment 40 can be independently controlled by adjusting the speed of the pump 44, the power supplied to the heater 46, the speed of the blower 50, and/or the position of the three-way valve 52 for each module 38 for a desired cumulative effect. For example, in multi-temperature applications, the temperature control system 10 provides the advantage of precise temperature control within each compartment 40 by independent control of the cooling or heating/defrost mode of operation of the heat exchange modules 38 in each compartment 40 as desired, such that one or more compartments 40 can be heated/defrosted while one or more additional compartments 40 are being cooled. Additionally, one or more compartments 40 can be operated in the same mode and maintain different set point temperatures.

If there is not enough energy available to simultaneously drive all of the electric appliances needed for the cooling mode, the cooling pull down operation can be divided into several repeating steps. This can occur, for example, when the temperature difference between ambient temperature outside of the compartment container 15 and the desired temperature inside the container 15 is very high and the temperature control system 10 has been turned off for an extended period of time.

Initially, the compressor 16 and a condenser fan 60 (or alternately, a condenser cooling fluid pump, not shown) are running, and all other electrical appliances are off. Thus, the secondary coolant fluid in the cooler 32 is being cooled relatively quickly. The evaporating temperature and the compressor suction pressure are decreasing with the temperature drop of the secondary coolant fluid followed by the drop of the compressor input power.

Then the compressor 16 and the condenser fan 60 are switched off, and the fluid pump(s) 44 and the blower(s) 50 of one or more of the heat exchange modules 38 are switched on when the temperature difference between the inside load space of the compartment 40 and the secondary coolant fluid is large enough, for example, about 10 Kelvin.

Finally, the compressor 16 and the condenser fan 60 are again turned on, while the fluid pump(s) 44 and the blower(s) 50 are turned off when the temperature difference between the inside load space of the compartment 40 and the secondary coolant fluid is too small, for example, about 3 Kelvin.

All electrical appliances can be turned on at the same time when the total power consumption is equal to or lower than the available power input. Such a case occurs when the temperature within the load space of the container 15 drops below certain limit. Note, that the input power for the fluid pumps 44 of the secondary circuit 30 increases with the drop of the secondary coolant fluid temperature, but compared to the changes in compressor input power, the changes in input power for the fluid pumps 44 of the secondary circuit 30 are not substantially significant.

What is claimed is:

1. A temperature control system for a container having a plurality of compartments, the temperature control system comprising:
    a refrigeration circuit having a primary fluid circulating therein;
    a secondary fluid circuit in communication with a first compartment of the container and
    a second compartment of the container, the secondary fluid circuit having a secondary fluid circulating therein, the secondary fluid being separate from the primary fluid, the secondary fluid circuit including
        a first heat exchange module in communication with an interior load space of the first compartment, and
        a second heat exchange module in communication with an interior load space of the second compartment,
        each of the first and second heat exchange modules including a pump configured to pump the secondary fluid, a heater selectively operable to heat the secondary fluid, a heat exchanger positioned within the respective interior load space, and a three-way valve configured to control the flow of the secondary fluid through the respective heat exchange module, the three-way valve operable to direct a first portion of the secondary fluid from the heat exchanger to the heat exchange interface before flowing back to the heat exchanger through the pump and the heater and to concurrently direct a second portion of the secondary fluid from the heat exchanger through the pump and the heater and back to the heat exchanger without flowing to the heat exchange interface; and
    a heat exchange interface between the refrigeration circuit and the secondary fluid circuit operable to transfer heat from the secondary fluid to the primary fluid.

2. The temperature control system of claim 1, wherein the first heat exchange module is positioned in the interior load space of the first compartment, the second heat exchange module is positioned in the interior load space of the second compartment, and the refrigeration circuit is remote from all of the plurality of compartments.

3. The temperature control system of claim 1, wherein each of the first and second heat exchange modules includes a blower positioned adjacent the heat exchanger and configured to blow air within the interior load space of the compartment across the heat exchanger.

4. The temperature control system of claim 3, wherein at least one of the speed of the pump, the power supplied to the heater, the speed of the blower, and the position of the three-way valve are variable to maintain the first compartment and the second compartment of the container at different set point temperatures.

5. The temperature control system of claim 1, wherein the three-way valve of each of the first and second heat exchange modules is a stepper valve.

6. A temperature control system for controlling the temperature within a container, the temperature control system comprising:
- a refrigeration circuit having a primary fluid circulating therein;
- a secondary fluid circuit having a secondary fluid circulating therein, the secondary fluid being in heat exchange communication with the primary fluid and also with an interior load space of the container, wherein the secondary fluid circuit includes
  - a heat exchanger positioned within the interior load space,
  - a pump configured to pump the secondary fluid through the heat exchanger,
  - a heater selectively operable to heat the secondary fluid, and
  - a three-way valve configured to control the flow of the secondary fluid within the secondary fluid circuit; and
- a heat exchange interface between the refrigeration circuit and the secondary fluid circuit operable to transfer heat from the secondary fluid to the primary fluid, the three-way valve being movable between a first position, in which the secondary fluid is directed from the heat exchanger to the heat exchange interface and a second position, in which the secondary fluid is substantially recycled through the heat exchanger without being directed to the heat exchange interface, the three-way valve operable to direct a first portion of the secondary fluid from the heat exchanger to the heat exchange interface before flowing back to the heat exchanger through the pump and the heater and to concurrently direct a second portion of the secondary fluid from the heat exchanger through the pump and the heater and back to the heat exchanger without flowing to the heat exchange interface.

7. The temperature control system of claim 6, wherein the pump, the heater, and the three-way valve are positioned in the interior load space of the container, and the refrigeration circuit is remote from the interior load space of the container.

8. The temperature control system of claim 6, further comprising a blower positioned adjacent the heat exchanger and configured to blow air within the interior load space of the container across the heat exchanger.

9. The temperature control system of claim 8, wherein at least one of the speed of the pump, the power supplied to the heater, the speed of the blower, and the position of the three-way valve are variable to maintain the interior load space of the container at a predetermined set point temperature.

10. The temperature control system of claim 6, wherein the three-way valve of the secondary fluid circuit is a stepper valve.

11. A temperature control system for controlling the temperature within a container, the temperature control system comprising:
- a heat exchanger positioned within an interior load space of the container;
- a heater in series with the heat exchanger along a fluid circuit loop;
- a pump in series with the heater and the heat exchanger along the fluid circuit loop;
- a valve positioned along the fluid circuit loop, the valve having an inlet, a first outlet, and a second outlet, the first outlet being coupled to a fluid return line, and the second outlet being coupled to an inlet of the pump;
- a heat exchange fluid configured to circulate through the fluid circuit loop; and
- a refrigeration circuit separate from the fluid circuit loop and operable to draw heat from the heat exchange fluid at a heat exchange interface, the fluid circuit loop being in heat exchange communication with the refrigeration circuit at the heat exchange interface by the fluid return line and by a fluid supply line of the fluid circuit loop, wherein the fluid supply line is operable to supply heat exchange fluid cooled by the refrigeration circuit to the inlet of the pump, the three-way valve operable to direct a first portion of the heat exchange fluid from the heat exchanger to the heat exchange interface before flowing back to the heat exchanger through the pump and the heater and to concurrently direct a second portion of the heat exchange fluid from the heat exchanger through the pump and the heater and back to the heat exchanger without flowing to the heat exchange interface.

12. The temperature control system of claim 11, wherein the pump, the heater, and the valve are positioned in the interior load space of the container, and the refrigeration circuit is remote from the interior load space of the container.

13. The temperature control system of claim 11, further comprising a blower positioned adjacent the heat exchanger and configured to blow air within the interior load space of the container across the heat exchanger.

14. The temperature control system of claim 13, wherein at least one of the speed of the pump, the power supplied to the heater, the speed of the blower, and the position of the valve are variable to maintain the interior load space of the container at a predetermined set point temperature.

15. The temperature control system of claim 11, wherein the valve is a stepper valve.

16. A method of controlling the temperature within a container, the method comprising:
- providing a heat exchange module inside a compartment of the container, the heat exchange module including a fluid pump, a heater, a heat exchanger, and a valve operable to selectively direct heat exchange fluid from the heat exchanger to at least one of
  - the fluid pump for closed loop circulation through the heat exchange module, and
  - a cooler where the heat exchange fluid is cooled by an evaporator of a remote refrigeration circuit, the valve operable to direct a first portion of the heat exchange fluid from the heat exchanger to the cooler before flowing back to the heat exchanger through the pump and the heater and to concurrently direct a second portion of the heat exchange fluid from the heat exchanger through the pump and the heater and back to the heat exchanger without flowing to the cooler;
- operating the heat exchange module in a first mode including
  - pumping the heat exchange fluid through the heater and the heat exchanger of the heat exchange module with the heater set to an off condition so as not to heat the heat exchange fluid,
  - drawing heat from an interior load space of the compartment into the heat exchange fluid,
  - directing heated heat exchange fluid through the valve to the cooler, whereby heat from the heat exchange fluid is transferred to a refrigerant fluid in the evaporator of the remote refrigeration circuit such that the heat exchange fluid is cooled, and
  - pumping cooled heat exchange fluid back into the heat exchanger of the heat exchange module; and operating the heat exchange module in a second mode including pumping the heat exchange fluid through the heater and the heat exchanger with the heater set to an on condition, heating the interior load space of the compartment, and directing at least a portion of the heat exchange fluid through the valve back to the heater without passing through the cooler so that the heat exchange module operates in a substantially closed loop manner.

17. The method of claim 16, wherein operating the heat exchange module in the first mode further includes at least one of lowering the speed of the pump and moving the valve to at least partially restrict the flow of heat exchange fluid from the heat exchanger to the cooler when a temperature within the interior load space of the compartment reaches a predetermined set point.

18. The method of claim 17, further comprising stopping operation of the remote refrigeration circuit.

19. The method of claim 16, wherein operating the heat exchange module in the second mode further includes blocking the flow of the heat exchange fluid through the valve to the cooler so that the heat exchange module operates in a fully closed loop manner.

20. The method of claim 16, wherein operating the heat exchange module in the second mode further includes at least one of lowering the speed of the pump and lowering the power of the heater when a temperature within the interior load space of the compartment reaches a predetermined set point.

* * * * *